US012037849B2

(12) United States Patent
Mackey

(10) Patent No.: US 12,037,849 B2
(45) Date of Patent: Jul. 16, 2024

(54) LADDER SAFETY HANDRAIL

(71) Applicant: Steve Mackey, Bolton (CA)

(72) Inventor: Steve Mackey, Bolton (CA)

( * ) Notice: Subject to any disclaimer, the term of this patent is extended or adjusted under 35 U.S.C. 154(b) by 636 days.

(21) Appl. No.: 17/177,175

(22) Filed: Feb. 16, 2021

(65) Prior Publication Data

US 2022/0259921 A1 Aug. 18, 2022
US 2024/0003188 A9 Jan. 4, 2024

Related U.S. Application Data

(60) Provisional application No. 62/986,774, filed on Mar. 9, 2020.

(51) Int. Cl.
*E06C 7/18* (2006.01)
*E06C 1/12* (2006.01)

(52) U.S. Cl.
CPC .............. *E06C 7/183* (2013.01); *E06C 1/125* (2013.01)

(58) Field of Classification Search
CPC ............. E06C 7/183; E06C 1/125; E06C 1/12
See application file for complete search history.

(56) References Cited

U.S. PATENT DOCUMENTS 4,425,984 A 1/1984 Lachance
10,101,189 B2 * 10/2018 Demski ................. F21V 23/003

(Continued)

FOREIGN PATENT DOCUMENTS

CN 212153948 U * 12/2020 .............. E04F 11/02
DE 20301470 U1 * 7/2004 ............... E04G 5/10
DE 202017000453 U1 * 3/2017 ............. E06C 1/387

OTHER PUBLICATIONS

CN212153948U_Translation_Description_20230713_2127.pdf (Year: 2020).*
DE20301470U1_translation.pdf (Year: 2004).*

*Primary Examiner* — Brian D Mattei
*Assistant Examiner* — Jacob G Sweeney
(74) *Attorney, Agent, or Firm* — Metropolis IP Group, LLC; Eric Kang

(57) ABSTRACT

A set of detachable base ladder safety handrails comprising: a pair of tubular cross-section handrails, wherein said handrails are made of metal, preferably aluminum, wherein one handrail is situated approximately one to a few inches away from the distal edge of one of the two ladder side rails, wherein a second handrail is situated approximately one to a few inches away from the distal edge of the second ladder side rail, wherein said pair of handrails are on or substantially on the same plane which ladder side rails and rungs connecting said ladder side rails lie, wherein said pair of handrails are parallel to each other and said ladder side rails, wherein a plurality of removable clamps is attached to each of said ladder side rails, wherein each of the said handrails is coupled to said plurality of removable clamps by a plurality of clamp-to-handrail links, wherein each clamp-to-handrail link is securely bonded, welded, or fastened to said clamp on one end and nearest handrail on said link's opposite end, wherein said clamp-to-handrail links are made of a solid circular, tubular, or thin shell cross-section and are preferably made from aluminum, wherein at least two clamps are attached to each ladder side rail and at least one clamp is attached near each of the two ends of said ladder side rail, wherein the surface of said handrails have a durable and high grip topology, preferably knurled.

1 Claim, 2 Drawing Sheets

(56) References Cited

U.S. PATENT DOCUMENTS

2005/0284699 A1* 12/2005 Fowler .................... E06C 7/183
182/106
2011/0266402 A1* 11/2011 Parrish ...................... E06C 5/20
224/310

* cited by examiner

LADDER SAFETY HANDRAIL

CROSS-REFERENCE TO RELATED APPLICATIONS

The present application claims priority to provisional patent application No. 62/986,774 filed on Mar. 9, 2020, disclosures of which are incorporated herein at least by reference.

FIELD OF THE DISCLOSURE

The field of the disclosure is a handrail for a ladder.

BACKGROUND OF THE DISCLOSURE

Handrails serve to stabilize the balance of people standing or walking on a staircase, bathtub, shower, escalator, and ladder. Lachance [U.S. Pat. No. 4,425,984] discloses a removable handrail for a ladder. However, this and all identified ladder safety handrails in the marketplace do not have the combination of handrails substantially along the same plane with at least one ladder member to minimize the chances of ladder tip-over, along with a surface topology feature which maximizes handgrip, while having the possibility of being removable, and the possibility to extend or telescope for an extendable-style of ladder.

SUMMARY OF THE DISCLOSURE

The present disclosure attempts to remedy all the previously mentioned issues with a novel, new safety handrail. This disclosure contains two main embodiments. One embodiment is for ladders with a single pair of side rails (hereinafter termed "EMB-L1P"). An alternative embodiment is for an extendable ladder comprising of two or more pairs of side rails (hereinafter termed "EMB-L2+P").

For EMB-L1P, each safety handrail is placed parallel and close to a ladder side rail on substantially the same plane where said ladder side rails and rungs connecting said ladder side rails lie. Each safety handrail is constrained to its closest ladder side rail by a plurality of removable clamps and clamp-to-handrail links. The ladder that EMB-L2+P is designed for comprises of two or more ladders, each section comprising of a pair of ladder side rails and rungs connecting the side rails of each ladder. The overall length of this extendable ladder is stretched when one ladder, hereinafter called the fly ladder, is linearly displaced relative to the next lower section of the ladder so that the bottom of the fly ladder is raised toward the top of the next lower ladder. Likewise, the extendable safety handrails are attached alongside and can telescope longer with the fly ladder as the overall length of the extendable ladder is increased and vice versa when the extendable ladder is shortened in overall length. For both embodiments, the safety handrails can be further extended for some distance above the top of the ladder. The surface of all embodiments of the safety handrails preferably has a knurled surface to maximize handgrip. Said embodiments also cater to ladder embodiments which open like an A-frame or when at least two ladders are in contact with a ground surface, said sections are splayed apart by a finite angle less than 180 degrees, and said two sections intersect at some point above the ground surface.

BRIEF DESCRIPTION OF THE DRAWINGS

The drawings are provided to facilitate understanding in the detailed description. It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE DISCLOSURE

Figure 1:
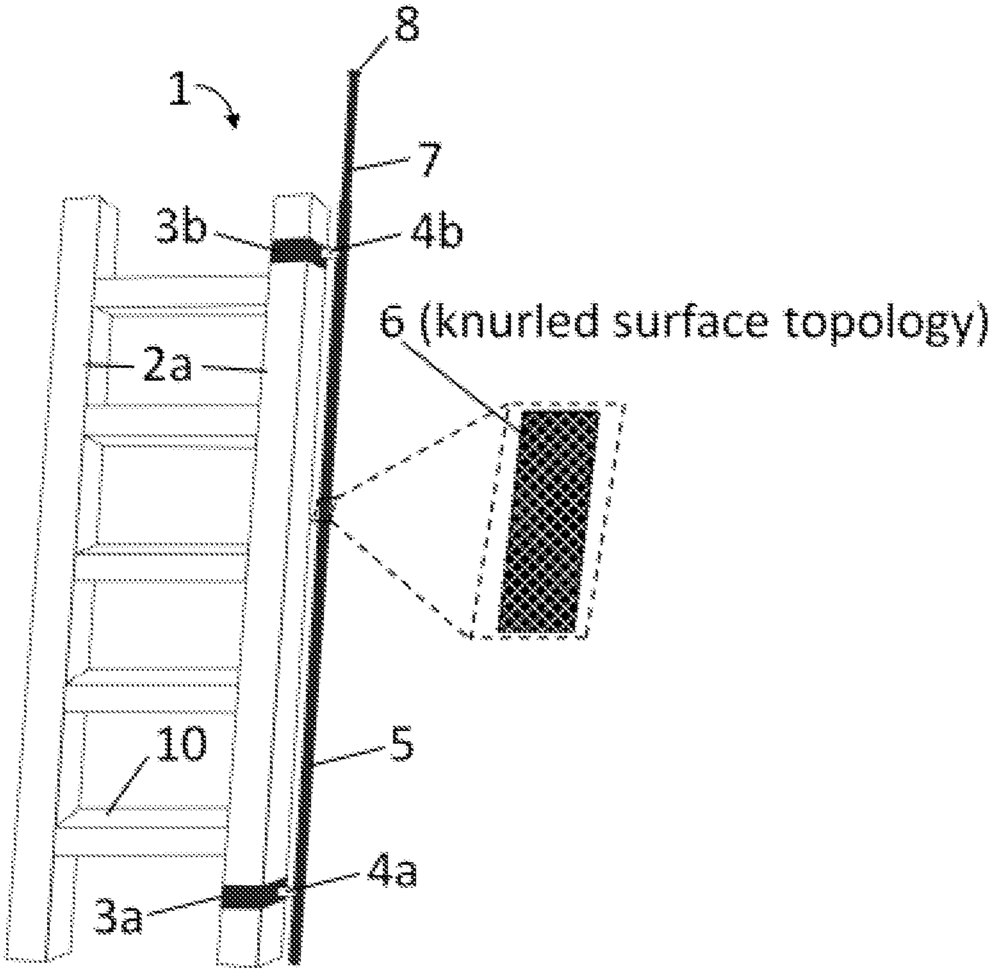
FIG. 1 is a three-quarter view of the single ladder member embodiment "EMB-L1P" as well as zoom views of the knurled safety handrail surface.

SAFETY HANDRAIL FOR SINGLE MEMBER LADDER (FIG. 1): FIG. 1 shows a three-quarter view of the "EMB-L1P" embodiment (1) meant for ladders with a single pair of side rails (2*a*). This ladder (10) comprises of two slender, long, laterally distal elements, called "side rails" (2*a*). As illustrated, each of the side rails (2*a*) has attached to it, an assembly of at least two "clamps" (3*a*, 3*b*), at least two "clamp-to-handrail links" (4*a*, 4*b*), one "base ladder safety handrail" (5) with a "knurled surface" (6), one "extendable top safety handrail" (7) with the same knurled surface (6) topology as in the base ladder safety handrail (5), and one "extendable top safety handrail tip" (8). The illustration shows only an assembly on one side of the ladder, but in practice, an identical assembly is attached to the side rail (2*a*) on the opposite side as a symmetric installation.

One clamp (3*a*) is placed at the bottom and another clamp (3*b*) is attached to the top of the side rail (2*a*). Each clamp (3*a*, 3*b*) is attached to a clamp-to-handrail link (4*a*, 4*b* respectively), that in turn is attached to the base ladder safety handrail (5). The endpoints of the base ladder safety handrail (5) are roughly near the endpoints of the side rail (2*a*) such that a substantial length of the side rail (2*a*) runs alongside the base ladder safety handrail (5) and is therefore substantially along the same plane as the single member ladder (10). Arranging as such reduces the chance of tip-over of said ladder (10) by keeping the operator's body close to the plane of said ladder (10). In another embodiment, intermediate clamps and "clamp-to-handrail links" (not shown) can be attached in between the two endpoint clamps (3*a*, 3*b*) if required for additional structural rigidity of the base ladder safety handrail (5).

An extendable top safety handrail (7) of slightly smaller diameter than the base ladder safety handrail (5) can extend further like a telescoping radio antenna to provide additional length beyond the top of the side rail (2*a*). This extendable top safety handrail (7) is situated at the opposite end of the feet of said ladder (10) that touches the ground surface. A tip (8) attached to the open end of the extendable top safety handrail (7) has a somewhat larger diameter than the extendable top safety handrail (7) to facilitate the operator gripping and telescoping the extendable top safety handrail (7). Optionally, the difference between the inner diameter of the base ladder safety handrail (5) and outer diameter of the extendable top safety handrail (7), where the former is slightly larger, is small enough to allow an interference fit and provide some resistance during extension and retracting. Once fully extended, an embodiment incorporating a locking mechanism can prevent inadvertent retracting of the extendable top safety handrail (7).

Figure 2:
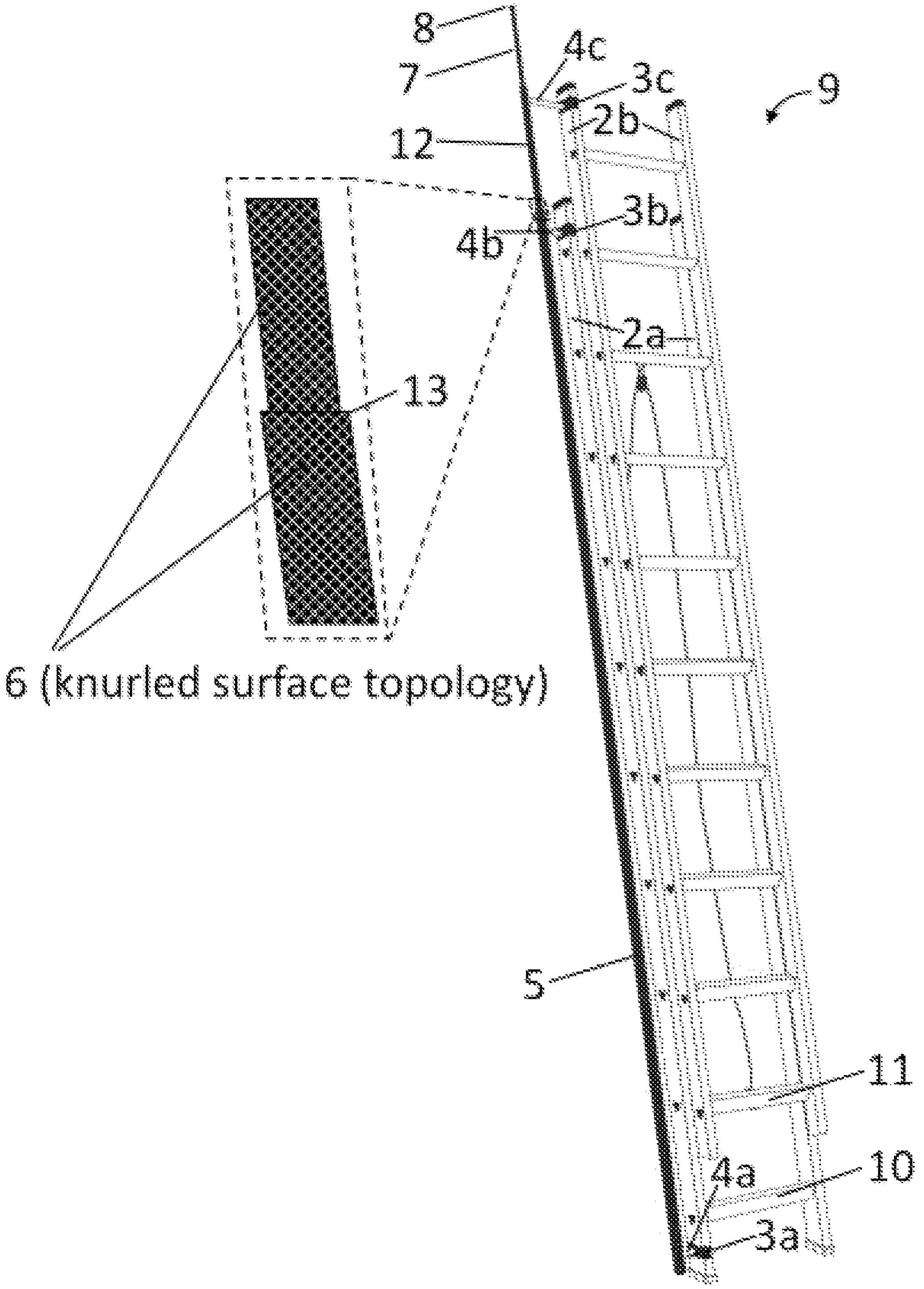
FIG. 2 is a three-quarter view of the extendable ladder embodiment "EMB-L2+P" as well as zoom views of the junction between the fixed and telescoping portion of the base ladder safety handrail and the fly ladder safety handrail.

SAFETY HANDRAIL FOR EXTENDABLE LADDER (FIG. 2): FIG. 2 shows a three-quarter view of the "EMB-L2+P" embodiment (9) as applied to an "extendable ladder" (10, 11). The extendable ladder (10, 11) comprises of a "base ladder" (10) and at least one "fly ladder" (11) which can slide relative to the base ladder (10). Both the base ladder (10) and fly ladder (11) each comprise of a side rail (2*a* and 2*b*, respectively) at each of the distal lateral extents. As illustrated, the safety handrail assembly for the extendable ladder (10, 11) has the following attached for each side rail: at least three "clamps" (3*a*, 3*b*, 3*c*), at least three "clamp-to-handrail links" (4*a*, 4*b*, 4*c*), one "base ladder safety handrail" (5) with a "knurled surface" (6), one "fly ladder safety handrail" (12), one "extendable top safety handrail" (7) with the same knurled surface (6) topology as in the base ladder safety handrail (5), and one "extendable top safety handrail tip (8).

On each side of the base ladder (10), at least two clamps (3*a*, 3*b*), at least two clamp-to-handrail links (4*a*, 4*b*), and a base ladder safety handrail (5) are implemented like the single member ladder embodiment (1) discussed in FIG. 1. Therefore, the base ladder safety handrail (5) is substantially along the same plane as the base ladder (10). Arranging as such reduces the chances of the extendable ladder (10, 11) tipping over by keeping the operator's body close to the plane of the base ladder (10). In another embodiment, additional intermediate clamps and clamp-to-handrail links (not shown) can be attached in between the two endpoint clamps (3*a*, 3*b*) if required for additional structural rigidity of the base ladder safety handrail (5).

Connected along the same directional axis to the base ladder safety handrail (5) for this embodiment is a fly ladder safety handrail (12). The transition portion (13) from said base ladder safety handrail to fly ladder safety handrail is such that the inner diameter of the base ladder safety handrail (5) is slightly larger than the outer diameter of the fly ladder safety handrail (12) where the diameter difference can optionally be small enough to allow a high friction interference fit and provide some resistance during extension and retracting. The top of the fly ladder safety handrail (12) is attached to clamp-to-handrail link (4*c*), which in turn is connected to a clamp (3*c*) at the side rail (2*b*) near the top of the fly ladder (11) as shown in FIG. 2. Hence the fly ladder safety handrail (12) extends and retracts as the fly ladder (11) extends and retracts, respectively. The extendable top safety handrail (7) and extendable top safety handrail tip (8) have the analogous telescoping and relative diameter relationship to the fly ladder safety handrail (12) as the extendable top safety handrail (7) has with the base ladder safety handrail (5) for the "EMB-L1P" embodiment (1). Likewise, an embodiment incorporating a locking mechanism can be used to prevent inadvertent retracting of the extendable top safety handrail (7) once fully extended. As apparent in FIG. 2, the chance of the extendable ladder (10, 11) tipping over is minimized because the fly ladder safety handrail (12) is on or substantially along the same plane as the base ladder (10)_as well as being on or slightly below the plane of the fly ladder (11) which allows the operator's body to be close to the plane of the fly ladder (11).

FIG. 2 shows the assembly for the "EMB-L2+P" embodiment (9) for only one side of the extendable ladder (10, 11), but in practice, an identical assembly is attached to the side rails (2*a*, 2*b*) on the opposite side as a symmetric installation. Furthermore, while the exemplary extendable ladder (10, 11) has one fly ladder (11), this disclosure can readily teach an embodiment of extendable ladders with two or more fly ladders (11) by repetition of the arrangement shown for the fly ladder safety handrail (12) along with the associated clamp (3*c*) and clamp-to-handrail link (4*c*).

CONSTRUCTION AND JOINING: The preferred construction embodiment for the base ladder safety handrail (5), fly ladder safety handrail (12), and extendable top safety handrail (7) is solid circular or tubular cross-section aluminum. The preferred surface topology embodiment of the safety handrails (5, 7, and 12) is knurled (6) to improve grip over a smooth surface. The clamp-to-handrail link (4*a*, 4*b*, 4*c*) embodiment can have a solid circular, tubular, or thin shell cross-section and is preferably made from aluminum. Said clamp-to-handrail links (4*a*, 4*b*, 4*c*) are fixed with the base ladder safety handrail (5) or fly ladder safety handrail (12) by use of a fastener, adhesive, or weld. The base ladder clamp-to-handrail links (4*a*, 4*b*) are attached to the corresponding clamps (3*a*, 3*b*) by way of fastener, adhesive, or weld.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

What is claimed is:

1. A set of telescoping ladder safety handrails comprising:

a pair of tubular cross-section handrails each made up of multiple segments of different outer diameters;

wherein each handrail is attached substantially parallel to a ladder side rail;

wherein said pair of handrails are on or substantially on the same plane in which ladder side rails and rungs connecting said ladder side rails lie;

wherein one or more removable clamps are attached to each of said ladder side rails;

wherein each of the said handrails is coupled to each clamp by a clamp-to-handrail link;

wherein each clamp-to-handrail link is coupled to said clamp on one end and the nearest handrail on said link's opposite end;

wherein an additional pair of intermediate segment handrails are connected to the side rails of a fly ladder to serve as fly ladder safety handrails for an extendable ladder;

said intermediate segment(s) of each fly ladder handrail are part(s) of each single telescoping handrail;

wherein the end of the intermediate segment furthest from the ladder's feet end is coupled to the side rail of said fly ladder furthest from the ladder's feet end such that when the fly ladder is extended out or retracted, the corresponding intermediate segment telescopes out or in, respectively;

wherein each intermediate segment is coupled to said fly ladder using a clamp and clamp-to-handrail link;

wherein the segment at the end furthest from the feet is an extendable top safety handrail;

said extendable top safety handrail is extendable beyond or above the ladder;

said extendable top safety handrail further having a ball or disc-like tip for the purpose of facilitating extension or retraction of said extendable top safety handrail;

wherein the surface of said handrails has a knurled surface topology.

* * * * *